United States Patent [19]
Raith et al.

[11] Patent Number: 4,947,409
[45] Date of Patent: Aug. 7, 1990

[54] APPARATUS FOR CORRECTING FREQUENCY IN A COHERENT RECEIVER

[75] Inventors: Alex K. Raith, Kista; Bo G. Hedberg, Vällingby; Jan-Erik Stiernvall, Sollentuna, all of Sweden

[73] Assignee: Telefonaktiebolaget L M Ericsson, Stockholm, Sweden

[21] Appl. No.: 356,205

[22] Filed: May 24, 1989

[51] Int. Cl.⁵ .................................. H04L 27/06
[52] U.S. Cl. ................................. 375/97; 375/99; 455/256
[58] Field of Search ............... 375/77, 97, 98, 99; 455/46, 47, 256, 257, 258, 259, 264, 240, 245, 192, 200; 329/124, 140

[56] References Cited

U.S. PATENT DOCUMENTS

| | | | |
|---|---|---|---|
| 4,291,269 | 9/1981 | Nossen | 375/97 |
| 4,485,477 | 11/1984 | Nossen | 375/97 |
| 4,520,493 | 5/1985 | Heard et al. | 375/97 |
| 4,584,710 | 4/1986 | Hansen | 455/226 |
| 4,627,079 | 12/1986 | Von der Embse | 375/97 |
| 4,691,377 | 9/1987 | Yoshihara et al. | 375/97 |
| 4,726,069 | 2/1988 | Stevenson | 455/46 |
| 4,835,792 | 5/1989 | Davarian | 455/142 |

OTHER PUBLICATIONS

Marsan et al., "Time-Domain Simulation of a Telecommunication Distress System"; Proceedings of an International Symposium by University of Bologna; Bologna, Italy, Sep. 19-21, ESA Nov. 1-16, 1979.

*Primary Examiner*—Benedict V. Safourek
*Assistant Examiner*—Stephen Chin
*Attorney, Agent, or Firm*—Burns, Doane, Swecker & Mathis

[57] ABSTRACT

Apparatus for correcting the frequency in a coherent receiver associated with a radio communication installation, e.g. a mobile telephone installation for transmitting digital information in time-division multiplex. The receiver includes a controllable local oscillator (7) for generating a mixing signal for converting the frequency of a received signal, and unit (4,8,9) for calculating a frequency error and generating a control signal (f') to the oscillator (7). Each new value of the control signal (f') is dependent on a previous value and on the calculated frequency error, and is utilized for correcting the frequency of said mixing signal. At least the major part of a frequency error in the receiver is thus eliminated. A possibly remaining part of a required frequency correction is carried out by a frequency change in the baseband. This is achieved with the aid of a unit (11) included in the receiver, and adapted to perform regularly repeated phase shifts of a signal (I,Q) in the baseband by a value ($V_r$), which is changed for each received modulation symbol, e.g. a data bit, and which is responsive to said remaining part of the required frequency correction.

5 Claims, 3 Drawing Sheets

APPARATUS FOR CORRECTING FREQUENCY IN A COHERENT RECEIVER

FIELD OF THE INVENTION

The invention relates to an apparatus for correcting the frequency in a coherent receiver of a radio communication installation. The receiver includes a controllable, local oscillator for generating a mixing signal for converting the frequency of a received signal, means for calculating a frequency error and means for generating a control signal to the local oscillator, each new value of the control signal being dependent on a previous value and the calculated frequency error. A frequency error in the receiver is eliminated, at least to a great extent, by correcting the frequency of the mixing signal. The apparatus is intended for use in system such as mobile telephone equipment transmitting digital information in time-division multiplex.

BACKGROUND OF THE INVENTION

An apparatus of the kind mentioned above is described in the article "Radio Test performance of a Narrowband TDMA system" by Stjernvall, Hedberg and Ekemark, published in IEEE Vehicular Tech. Conf. Tampa. Florida, U.S.A., June 1987. A similar apparatus is also described below with reference to FIG. 1.

The frequency error in a receiver with at least a roughly adjusted frequency is estimated in a unit for calculating frequency error, and a control processor generates a correction signal for each new time slot in response to the magnitude of the correction during the previous time slot and the estimated frequency error. The correction signal is supplied to a controllable local oscillator, which is a frequency synthesizer, according to the mentioned article, and is adapted to generate mixing signals, the frequencies of which are corrected in response to the control processor signal. The latter is digital and in practice is converted to analog form in a digital-analog converter before being supplied to the local oscillator. The number of steps with which the frequency from the oscillator can be adjusted is therefore dependent on the number of binary bits which the converter can convert. If a relatively small and simple converter is used the result will be that either the maximum frequency from the local oscillator is relatively small, or the frequency steps are relatively large.

Particularly with a coherent receiver, it is of great importance that the local frequency generator is locked to the transmitter frequency with rather good accuracy. This is because such a receiver may be said to operate with two dimensions, taking into account both phase and amplitude of the receiver signal.

From U.S. Pat. No. 4,520,493 it is known to perform frequency correction in the baseband of a signal received in a receiver. Only relatively small frequency errors can be corrected, however. For a large frequency error in a local oscillator in the receiver parts of the frequency band of the received signal will namely come outside the passband of the receiver filter.

SUMMARY OF THE INVENTION

The object of the invention is to propose an apparatus of the introductorily described kind, but with which accurate frequency correction can be performed, even if the frequencies of the mixing signals generated by the local oscillator can not be changed in sufficiently small steps. This is, in short, achieved by the part of a required frequency correction that can not be performed by changing the frequencies of the mixing signals being performed by a frequency change directly in the baseband. In turn, this is achieved by regularly repeated phase shifts in a baseband signal formed in the receiver.

According to a particular embodiment of the invention, there is also obtained a more rapid and correct frequency correction by the magnitude of the frequency change in the baseband not only being changed after each received time slot, but also after each received modulation symbol, e.g. a data bit, during each time slot.

BRIEF DESCRIPTION OF DRAWINGS

The invention will now be described in more detail, with reference to the drawings.

DETAILED DESCRIPTION OF THE PREFERRED EMBODIMENTS

Figure 1:
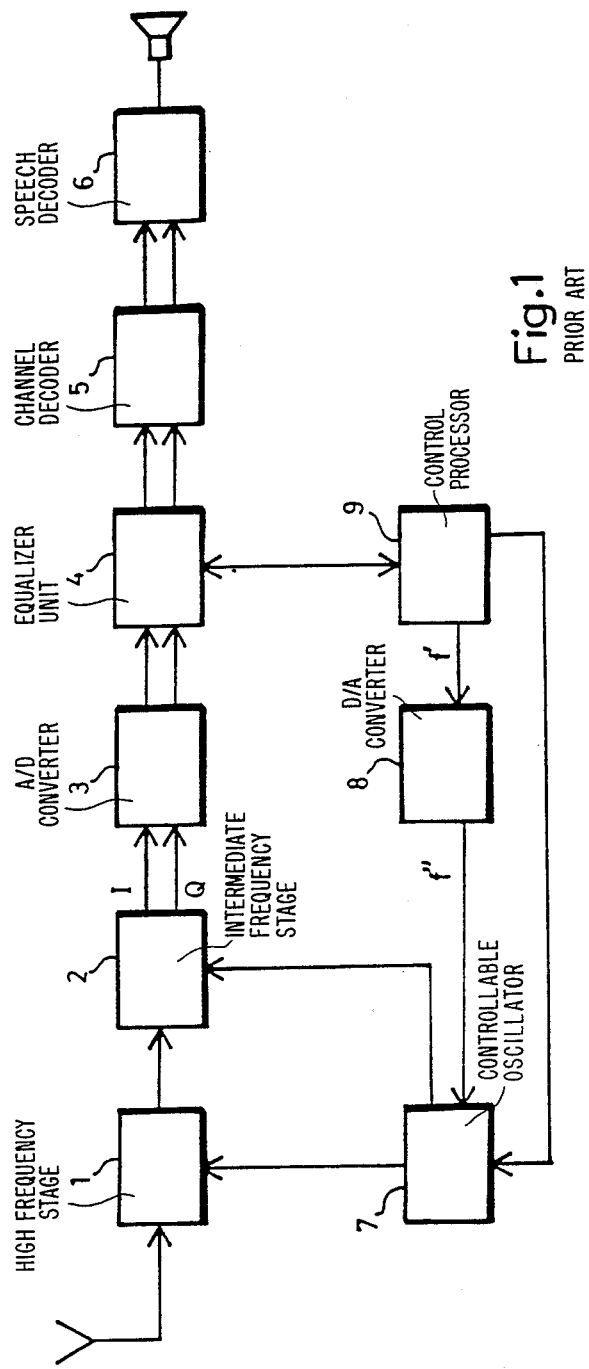
FIG. 1 illustrates a prior art receiver, FIG. 2 symbolically shows two received signals in a coherent receiver.

In FIG. 1 there is illustrated a prior art receiver intended for transmission in time-division multiplex of information in digital form, and of the same kind as is also described in the article mentioned above. The frequency of a received signal is mixed down in a high-frequency stage 1 and an intermediate-frequency stage 2, which obtain mixing signals from a controllable local oscillator 7, e.g. a frequency synthesizer. The frequencies of the mixing signals are approximately 900 and 45 MHz, although these should solely be regarded as examples. The receiver is intended for coherent demodulation and therefore two quadrature signals, an inphase (I) and a quadrature phase (Q) signal, in the baseband are transmitted from the intermediate frequency stage 2. In practice, the intermediate frequency stage contains two mixers which conventionally receive a mixing signal each, at the same frequency, but where the signals have a mutual phase shift of 90°.

The quadrature signals are analog-to-digital converted in their individual A-D converters, which have been put together in a single block 3 in the figures. The quadrature signals are then taken in digital form to a block 4. Included in this is an equalizer, e.g. in the form of a digital filter, and a unit for calculating frequency error. The unit may comprise a calculating unit in which the frequency error is calculated with guidance from the successively changed phase angles of the received signal in relation to its expected phase angle. As an explanation it may be said that the transmitted signal in coherent demodulation can be regarded as an indicating needle with its tip moving in a circle. This applies for so-called constant envelope modulation. At decision instants the tip shall be at one of a plurality of points along this circle.

Figure 2:
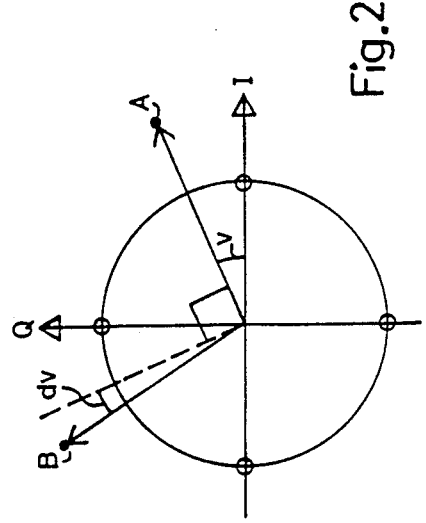

FIG. 2 is referred to in this connection, two received signals in a coherent receiver for constant envelope modulation being illustrated in it. The receiver is intended for quadrature modulation, and for a given type of modulation the tip of the above-mentioned needle shall, for example, be at one of the angular positions 0°, 90°, 180° or 270° relative the I-axis at the decision instants. These positions are denoted by small circles in the Figure. A condition is, however, that the receiver frequency is correctly set. A phase error will otherwise occur, the tip then pointing somewhere else, e.g. to A, the needle then having an angle v to the positive part of the I-axis in this example. In this case the receiver will interpret the received signal as though the tip had been in the circle on the positive part of the I-axis, i.e. in the angular position of 0°. If there is a frequency error the phase error v changes from decision instant to decision instant accumulatively. This means that at the next decision instant the needle tip could be at point B which is shifted 90° plus a phase error change dv from the preceding phase angle. In this type of modulation the phase is namely always shifted 90° during a bit time, although a frequency error in the receiver also causes a phase error change, e.g. of the magnitude dv. The phase error thus changes more and more for a frequency error, i.e. the phase deviation of the received signal changes more and more from the nearest point at the decision time, of the above-mentioned points. That the tips are not along the circumference of the circle is due to amplitude disturbances on the radio channel.

The frequency error is calculated during each received time slot, and is utilized in a manner described below for correcting the frequency during the next time slot. Information on the frequency error is supplied to a control processor 9, included in the receiver according to FIG. 1, for calculating a control signal f' to correct the frequency of the local oscillator 7. The control signal f' is first converted to analog form in a D-A converter 8, however, the value of its output signal being denoted f''. In the calculation of each new value of the control signal f' from the control processor attention is paid to the previous value and the frequency error which was calculated in the unit 4. This error is namely the one remaining after the frequencies of the step-down mixing signals have been corrected by the previous value. More specifically, in the calculation of a new value of the control signal f', there is first calculated a required frequency correction, hereinafter denoted f. This is the sum of the previous value of the control signal f' and the frequency error from the unit 4. The new value of the control signal f' is subsequently determined, such that it is quantized to certain levels agreeing with one of the different signal levels of the D-A converter 8.

The control processor 9 also generates, inter alia, control signals relating to channel selection which are sent to the local oscillator 7, this being indicated by a conductor between these units in FIG. 1.

The output signals from the unit 4 are sent to a channel decoder 5 and from there to a speech decoder 6, which conventionally correct bit errors in the digital bit stream for subsequently converting this to an analog speech signal.

As will have been understood from the above, problems may occur because the frequency of the mixing signal generated by the local oscillator 7 can not be changed in sufficiently small steps, since the D-A converter 8 can not convert a sufficient number of digital bits. This results in a remaining frequency error that can cause bit errors in the received signal. As is also mentioned above, it is particularly important that frequency errors are corrected in coherent receivers.

Figure 3:
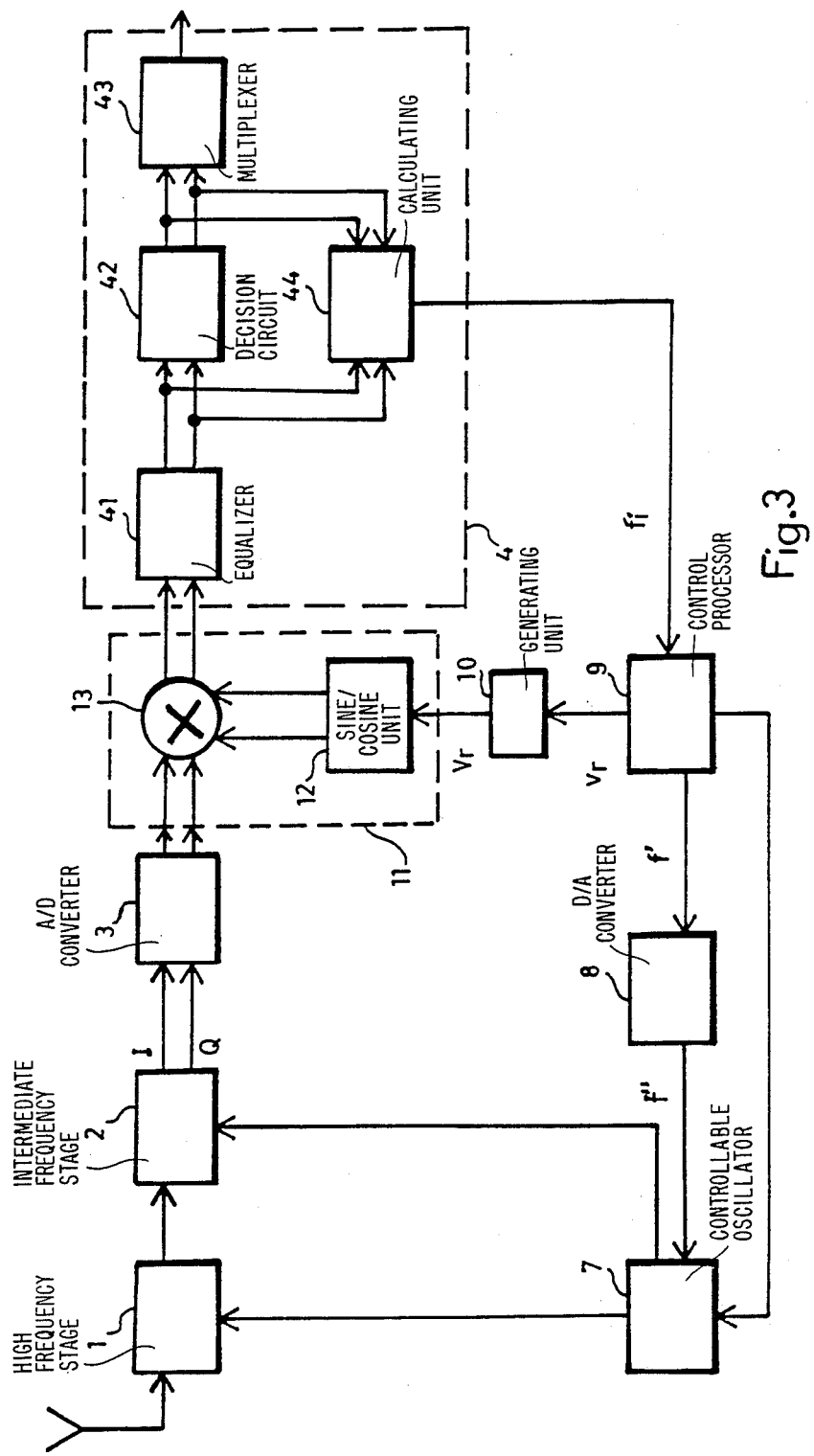
FIG. 3 illustrates a receiver in accordance with the present invention.

In FIG. 3 there is illustrated a preferred embodiment of a receiver in accordance with the present invention. Several of the units in this receiver are also to be found in the receiver of FIG. 1, and are therefore given the same denotations as in FIG. 1. It is pointed out that the illustrated implementation with separate high and intermediate frequency stages 1 and 2, each with its own mixing signal, is solely intended as an example.

Unit 4 is illustrated in more detail than before, although this embodiment is also merely introduced as an example. Included in the block are an equalizer 41, a decision circuit 42 and a multiplexer 43, the latter two conventionally decoding received signals. Block 44 symbolises the unit for calculating a frequency error, and may chiefly comprise a lowpass filter, a phase comparator, and a circuit for calculating the quotient dv/dt, where dv (as in FIG. 2) is the change in phase error between two decision instants and dt is the time therebetween. The exact implementation of the block is dependent on the modulation form selected, however. The output signal from the block 44, i.e. the calculated frequency error, is denoted $f_i$ and is updated for each received data bit.

The channel decoder 5 and speech decoder 6 in the receiver of FIG. 1 are no part of the invention, and are thus not indicated in FIG. 3.

The control processor 9 is supplied with the signal $f_i$, which denotes the magnitude of the frequency error calculated in the unit 44. As with the known receiver, the control processor generates a control signal f', the value of which is dependent on the preceding value and on the calculated frequency error. The control signal is supplied to the local oscillator 7 after conversion to an analogue value f'' in the D-A converter 8. In accordance with the invention, the control processor 9 also generates a control signal to anaccumulating unit 10. This signal represents the part of the required frequency correction f calculated in the control processor, and which can not be achieved by changing the frequency of one or both mixing signals generated by the local oscillator 7, since its input signal from the D-A converter 8 can not be changed in sufficiently small steps. The control signal to the unit 10 thus corresponds to the value of the residue $f_r$ occuring when the required frequency correction f, calculated in the control processor, is quantised to form the control signal f' to the local oscillator.

In calculating the required frequency correction f and control signal f', the value of the frequency error $f_i$ obtained after the last data bit in each time slot is utilized. The frequency error $f_i$ therefore does not really need to be updated for each databit, but only at the end of each time slot intended for the receiver.

In practice; the signal from the control processor 9 to the unit 10 is converted in the former such that it does not constitute a direct measure of a frequency error, but of a phase error, which is denoted $v_r$. Conversion from a frequency to a phase error may be performed by integrating the frequency error, and may of course be alternatively performed in a separate means instead of in the processor 9. The required frequency correction f calculated in the processor 9 is thus divided into the parts f' and $dv_r/dt$.

The accumulating unit 10 is disposed to form, in time with each databit received by the receiver, an accumulated value of the value of the signal at its input. Since the input signal from the processor 9 is constant and equal to $v_r$, the values $v_r$, $2v_r$, $3v_r$... etc are accordingly formed at the output of the unit 10 in time with the received data bits in each time slot. The unit is set to zero after each time slot. However, accumulation takes place such that the output value from the unit 10 is already $v_r$ before the first data bit in the time slot has been received. The output value after a random data bit is denoted $V_r$.

The accumulated value $V_r$ from the unit 10 is supplied to a means 11. The latter is disposed to execute a phase shift of the baseband signal from the A-D converter 3 with the value $V_r$ from the unit 10 for each data bit received. Observed over several bit times, this corresponds to a frequency change of the quadrature-represented base band signal with the above-mentioned residue $f_r$ of the required frequency correction f.

In Cartesian representation of the baseband signal, the unit 11 may comprise, for example, of a unit 12 and a digital multiplexer 13, as shown in the Figure. The unit 12 has two outputs, and is disposed to form the sine and cosine, respectively, of the signal applied to its input. Accordingly, $\sin V_r$ and $\cos V_r$ are generated at its outputs. The signals from the unit 12 are supplied to the multiplexer 13, which is disposed to execute a complex value multiplication of two complex numbers. One of these numbers is obtained from the A-D converter 3 and is denoted $Z1 = I + j \times Q$. The other is obtained from the unit 12 and is denoted $Z2 = \cos V_r + j \times \sin V_r$. The product of the number will be $Z1 \times Z2 = (I + j \times Q) \times (\cos V_r + j \times \sin V_r) = I \times \cos V_r - Q \times \sin V_r + j \times (I \times \sin V_r + Q \times \cos V_r)$, the real part being sent on one output of the multiplier and the imaginary part on its other output.

If the needle represented by the complex number Z2 from the means 12 has the length one, i.e. unit length, the multiplication of the complex number Z1 and Z2 corresponds, according to known theories, to the above-described phase and frequency change of the baseband signal. Phase and frequency changes as a result of complex multiplications in conjunction with quadrature representation are described in the article "Time-domain Simulation of a Telecommunication Distress System" by Marsan, Castellani and Pent, published as: Proceedings of an International Symposium sponsored by European Space Agency and University of Bologna: "SPACECAD 79 Computer-Aided Design of Electronics for Space Applications" Bologna Italy 19-21 Sept. 1979 (ESA SP-146. Nov. 1979).

In polar representation of the baseband signal, it may be expressed as $Z1 = rl \times \exp(j \times ul)$. In this case, the above-described phase and frequency change can be performed simply by a phase shift of the baseband signal by the accumulated value $V_r$ from the unit 10. The baseband signal Z1 then takes on the value $rl \times \exp(-j(ul + V_r))$. In this case the unit 11 may in principle comprise an adder that adds the value $V_r$ to the phase angle ul.

As in the known receiver of FIG. 1, the major part of a required frequency correction will be performed by changing the frequency of one or both of the mixing signals generated by the local oscillator 1. However, there is also achieved by the control signal $v_r$ from the processor 9 as well as unit 10 and 11, a supplementary correction of the frequency with the residue $f_r$ occuring at the above-mentioned guantisation of the required frequency correction f. This correction is thus performed by a frequency change directly in the baseband in the manner described above. Similarly as with the known receiver, the frequency correction takes place by a constant amount during a whole time slot, however.

With the inventive apparatus, the required frequency correction f calculated in the processor 9 for each time slot, and thereby the signal f' also, is not only dependent on the value of the control signal f' during the previous time slot and of the frequency error value $f_i$ at the end of the previous time slot, but also on the frequency error which was corrected by the control signal $V_r$ to the means 10 during the previous time slot.

Figure 4:
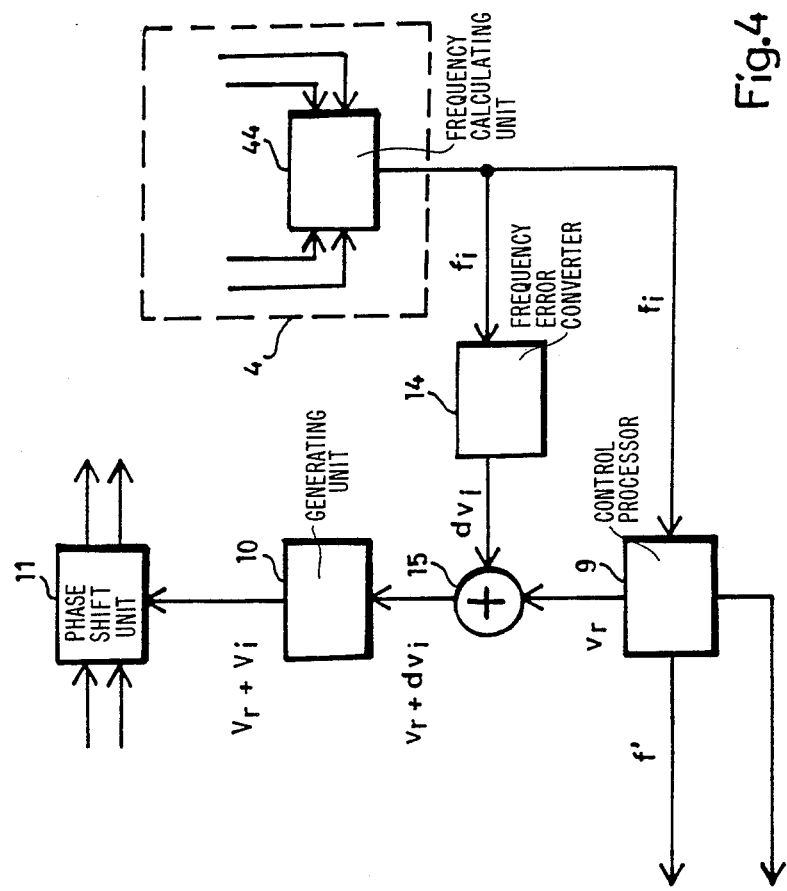
FIG. 4 illustrates parts of the receiver in FIG. 3, improved to enable more rapid and correct frequency correction.

In FIG. 4 there are shown parts of the receiver according to FIG. 3, but improved to enable more rapid and correct frequency correction. In this embodiment the receiver also includes a unit 14 for converting a frequency error to a phase error, as well as an adder 15. Since the frequency error $f_i$ from the frequency calculating unit 44 is updated for each data bit received, the phase error calculated in the unit 14 corresponds to the magnitude dv according to FIG. 2, i.e. the phase error change during a bit time. It is here assumed that the errors v and dv according to FIG. 2 are the errors remaining after the frequency correction performed by correcting the mixing signal frequency. To indicate that the phase error is updated for each data bit received the phase error is denoted $dv_i$ in FIG. 4, however. The output signal from the adder may thus be denoted $v_r + dv_i$.

If the accumulated value of the phase errors $dv_i$ occuring during a time slot after a random data bit is denoted $V_i$, the output signal from the accumulating unit 10 may be written $V_r + V_i$ in ths case, where $V_r$ (as in FIG. 3) denotes the accumulated value of the values $v_r$ from the control processor 9. The accumulated value $V_i$ thus corresponds to the collected phase error change from the means 14 after the data bit number i during a time slot. Before the first databit in each time slot is received, the output value of the signal from the unit 10, as with the receiver in FIG. 3, is equal to $v_r$. After the first data bit the output signal value is $2v_r + dv_1$, then $3v_r + dv_1 + dv_2$, etc.

According to this embodiment, as with the receiver in FIG. 3, a phase shift of the baseband signal is carried out, corresponding to a frequency change which, at the beginning of each time slot, is equal to the mentioned quantising residue $f_r$. During the rest of each time slot this frequency change is, however, corrected for each received data bit in response to the calculated frequency error $f_i$. With this arrangement there is thus afforded a more rapid and correct frequency correction than with the receiver of FIG. 3.

The invention is of course not restricted to the illustrated embodiments. For example, in the description it has been assumed that binary modulation is applied, which means that each modulation symbol solely contains information from a single binary data bit (logical one or zero). The invention is also applicable to non-binary modulation. In a more general case, it may therefore be said that the accumulated sum from the unit 10 is updated for each received modulation symbol instead of for "each data bit received".

The invention is similarly also applicable to systems which are not based on time-division multiplex. The control signals f' and $v_r$ can be updated regularly even so, e.g. after a given number of received modulation symbols or at certain definite time intervals.

It is further conceivable, for example, to eliminate the unit 14 for conversion from a frequency error to a phase error, if a phase error is calculated directly in the unit 44 instead. The block 4 and the block 11 as well could be quite well realized in completely different ways than according to the illustrated embodiments, e.g. by forming a common means in different ways. More pronounced software solutions than in the illustrated embodiments are also conceivable of course.

We claim:

1. An apparatus for correcting errors in a frequency of a signal which is received by a coherent receiver associated with a radio communication installation for transmitting digital information, comprising:

receiving means for receiving said frequency of said received signal;

frequency synthesizer means for generating a mixing signal corresponding to said frequency;

first calculating means for calculating a frequency error in a frequency of said mixing signal at predetermined time intervals;

first generating means coupled between said receiving means and said first calculating means for intermittently generating a first control signal to said frequency synthesizer means, said first control signal being dependent upon a previous value of said first control signal and said frequency error calculated by said first calculating means, said first control signal prompting a correction of said frequency of said mixing signal;

second generating means coupled between said first generating means and said first calculating means for generating a second control signal having a magnitude representing a phase error corresponding to a remaining part of a frequency correction calculated by said first calculating means, said remaining part not being corrected during the correction of said frequency of said mixing signal;

first accumulating means coupled to said second generating means for receiving said second control signal and for repetitively producing, at predetermined time intervals, a first accumulated sum of a value of said second control signal; and phase shift means coupled between said first accumulating means and said first calculating means for executing a phase shift of a baseband signal formed in said receiver, said phase shift including a current value of said first accumulated sum, wherein said remaining part of said frequency correction is carried out by a frequency change in said baseband.

2. An apparatus as claimed in claim 1, further comprising:

second calculating means coupled to said first calculating means for repetitively calculating at predetermined time intervals a phase error change in said received signal; and second accumulating means coupled between said second calculating means and said first accumulating means for producing a second accumulated sum of values of said phase error changes, said phase shift means being adapted such that for each phase shift said phase shift means also produces a phase shift of said baseband signal by a current value of said second accumulated sum of said values of said phase error changes.

3. An apparatus as claimed in claim 1, wherein said radio communication installation includes means for communicating with time-division multiplex transmissions.

4. An apparatus as claimed in claim 3, wherein said first control signal and said second control signal are renewed for each new time slot intended for said receiver.

5. An apparatus as claimed in claim 1, wherein said predetermined time intervals occur once for each modulation symbol received.

* * * * *